Patented Nov. 6, 1928.

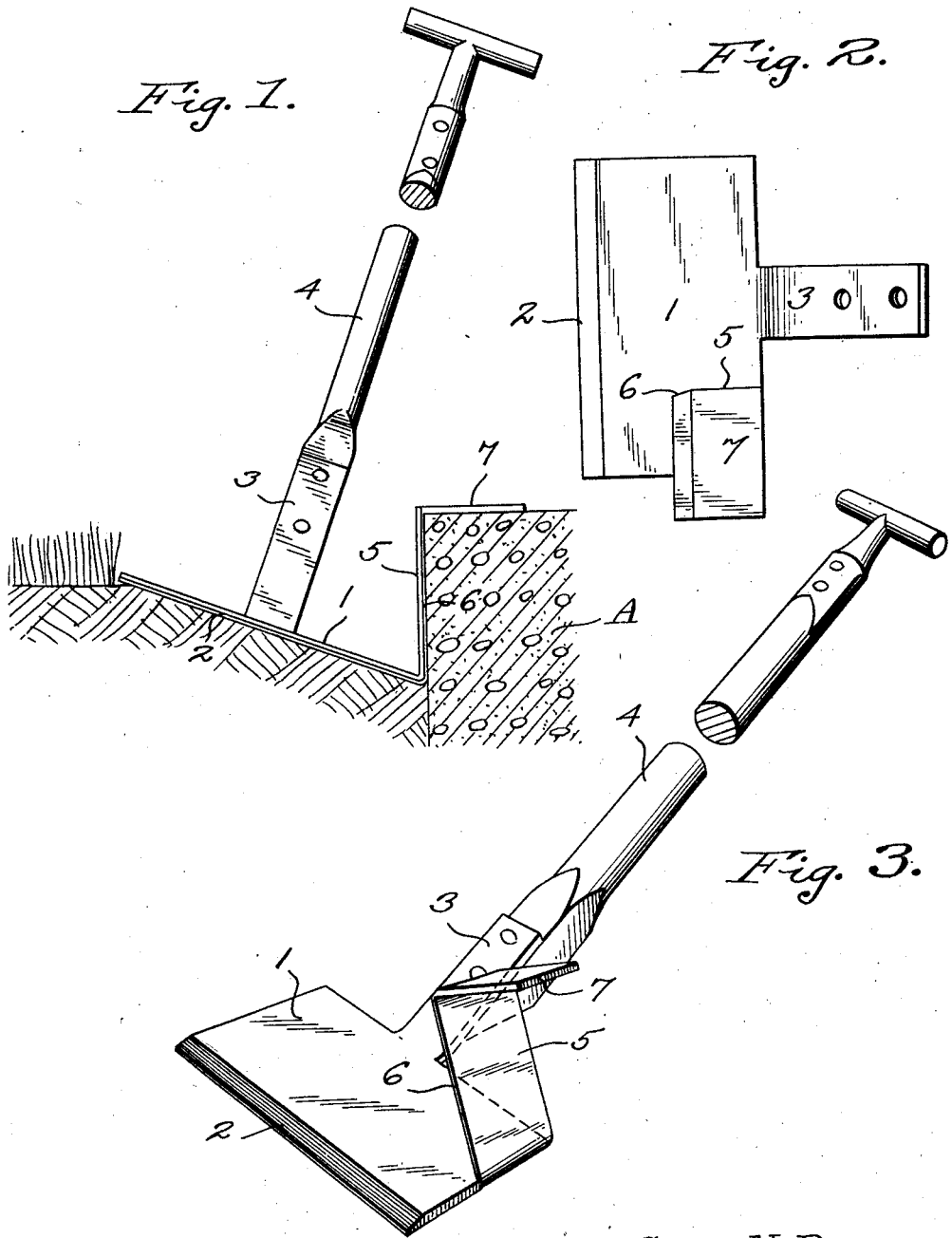

1,690,944

UNITED STATES PATENT OFFICE.

GEORGE H. PETERSON, OF ORANGE, CALIFORNIA.

LAWN-TRIMMING TOOL.

Application filed May 16, 1927. Serial No. 191,822.

This invention relates to a lawn edging tool, the general object of the invention being to provide a device for cutting the grass away from the edges of walks, curbing and the like so as to give the lawn an attractive and trim appearance by removing the grass adjacent the edges of the walks or curbing.

Another object of the invention is to so form the device that a groove or gutter with an outwardly sloping face will be formed adjacent the walk or curbing.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing how the device is used.

Figure 2 is a plan view of the head of the tool.

Figure 3 is a perspective view of the tool.

As shown in these views, the tool comprises a flat plate-like blade 1 which has a cutting edge 2 at its front and an upwardly extending strip 3 at its rear which is adapted to be fastened to a handle, such as 4. A side knife 5 is formed on one side edge of the blade 1 at the rear thereof, this knife 5 extending upwardly at an acute angle from the blade 1. Its front edge is beveled to form a cutting edge 6 and its upper end is formed with a right angular extension 7, the edges of which are not beveled. This part 7 forms a guide for engaging the upper surface of a walk or curbing, such as shown at A in Figure 1. The blade 5 will then lie in a vertical plane and engage the outer edge of the walk or curbing, with the main blade 1 extending upwardly and outwardly at an angle from the edge of the walk or curbing. Thus a groove or gutter will be cut adjacent the walk or curbing which has a beveled wall, the straight wall being formed by the side of the walk or curbing. By placing the side knife a distance from the cutting edge of the main knife or blade said main blade will break up the soil in advance of the side knife, thus making the operation of the tool much easier than if the side blade had its cutting edge in the same plane as the cutting edge of the main blade.

Thus this tool will place a neat edge on lawns, around walks, curbing and the like by leaving a small gutter around the edges of the walks.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tool of the class described comprising a flat main blade having a front cutting edge and an upwardly and outwardly extending strap at its rear edge, a handle connected with said strap, a side blade of less width than the main blade connected with the rear part of one side edge of the main blade and extending upwardly at an acute angle therefrom, said side blade having a front cutting edge and a rightangular extension formed on the upper end of the side blade forming a guiding member.

In testimony whereof I affix my signature.

GEORGE H. PETERSON.